Aug. 28, 1951 A. T. ZAPPIA 2,565,749
DRIVE FOR HOLLOW GLASSWARE FORMING APPARATUS
Filed April 11, 1946 3 Sheets-Sheet 1

INVENTOR.
ANTHONY T. ZAPPIA
BY W. P. Hahn
ATTORNEY

INVENTOR.
ANTHONY T. ZAPPIA
BY W. P. Hahn
ATTORNEY

INVENTOR.
ANTHONY T. ZAPPIA
BY W. P. Hahn
ATTORNEY

Patented Aug. 28, 1951

2,565,749

UNITED STATES PATENT OFFICE 2,565,749

DRIVE FOR HOLLOW GLASSWARE FORMING APPARATUS

Anthony T. Zappia, Indianapolis, Ind., assignor to S. & Z. Manufacturing Company, Inc., a corporation of Indiana Application April 11, 1946, Serial No. 661,282

6 Claims. (Cl. 49—14)

My present invention relates to improvements in glass blowing machines, and particularly to machines for blowing or forming hollow glass containers.

One of the objects of the present invention is to improve the drive of machines of the "two table" type, comprising parison and finishing mold carriers.

A further object of my invention is to provide an improved drive for machines of the above characteristic, which machines are operated by fluid pressure.

In machines of this character, which are now in commercial use, it has been the custom to drive the mold carrier table through means of a reciprocating rack and gear structure, operated by a fluid pressure operated reciprocating plunger. The parison mold carrying table has been driven from the finishing mold carying table through the medium of a train of gears extending between the rotating hubs of the tables.

It is extremely important, particularly with respect to the parison mold carrying table, that this table which is driven by the finishing mold carrying table, come to a stop with the parison molds in an exact position. The parison molds are positioned beneath a "gob" delivering mechanism, which delivers a "gob" of molten glass to the parison mold, located beneath the same, and the importance of the mold stopping in exact position is apparent.

One difficulty heretofore existing in connection with apparatus of this type now in commercial use, has been that the gears constituting the gear train between the finishing mold table and the parison mold table becomes worn, and as a result, considerable backlash develops between the gears, so that when the tables are brought to rest, there is no assurance that the parison mold will be accurately located beneath the "gob" delivery orifice of the furnace.

It is one of the objects of my present invention to provide a means whereby the gear train drive between the finishing mold table and the parison mold table may be supplemented by a booster drive operating on the parison mold table, which booster drive will also be so constructed as to insure the indexing of the parison mold, with respect to the delivery spout of the furnace.

For the purpose of disclosing my invention, I have illustrated an embodiment thereof in the accompanying drawings, in which.

Figure 1:
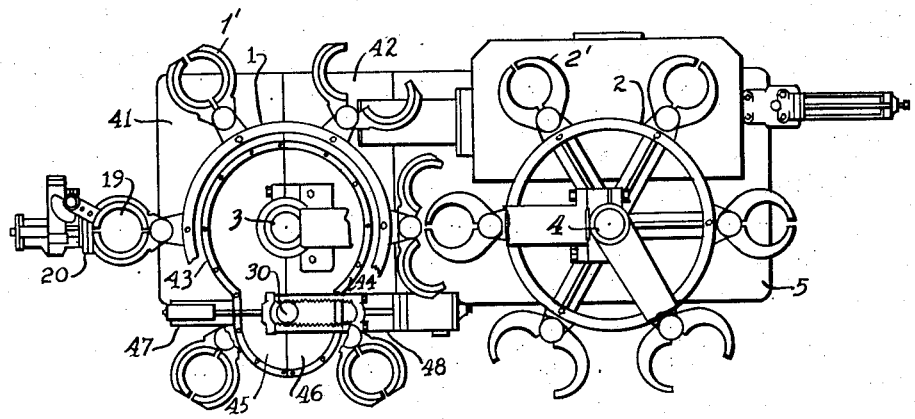
Fig. 1 is a diagrammatic plan view of a container forming machine embodying my invention.

In the embodiment of the invention illustrated, I provide laterally spaced parison and finishing mold carriers 1 and 2 having supports 1' and 2'. These mold carriers are rotatively mounted respectively on central columns 3 and 4 extending upwardly from and fastened to, at their lower ends, a suitable base 5. The finishing mold carrier 2 is supported upon a suitable hub 6 surrounding the column 4 and the mold carrier 1 is supported upon a suitable hub 7 surrounding the column 3.

The machine, so far as it applies to the operation and to the parts for the forming of the hollow glass containers, is substantially the same as that shown in United States Letters Patent No. 2,049,422 to Bridges, dated August 4, 1936, and reference is had to this patent for a disclosure of the operating parts, with the exception of the drive for the parison mold carrier.

Figure 2:
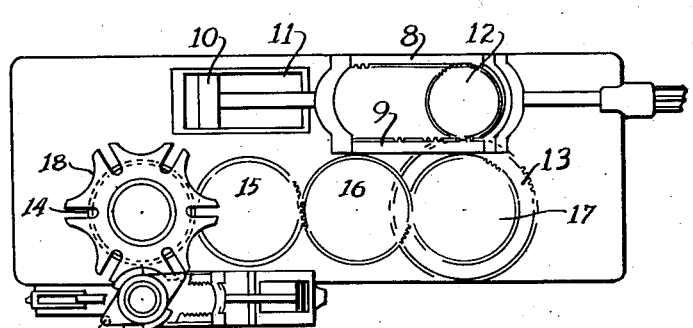
Fig. 2 is a diagrammatic plan view, showing more particularly the drive for the finishing mold table and the drive for the parison mold table.
Figure 6:
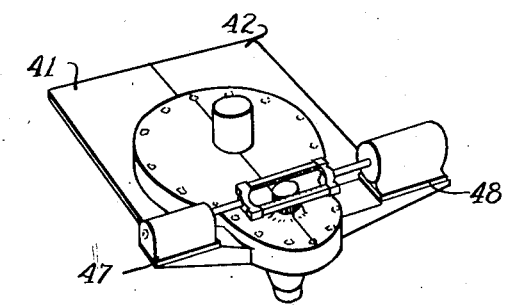
Fig. 6 is a detailed perspective view, showing more particularly the parison mold drive support.
Figure 3:
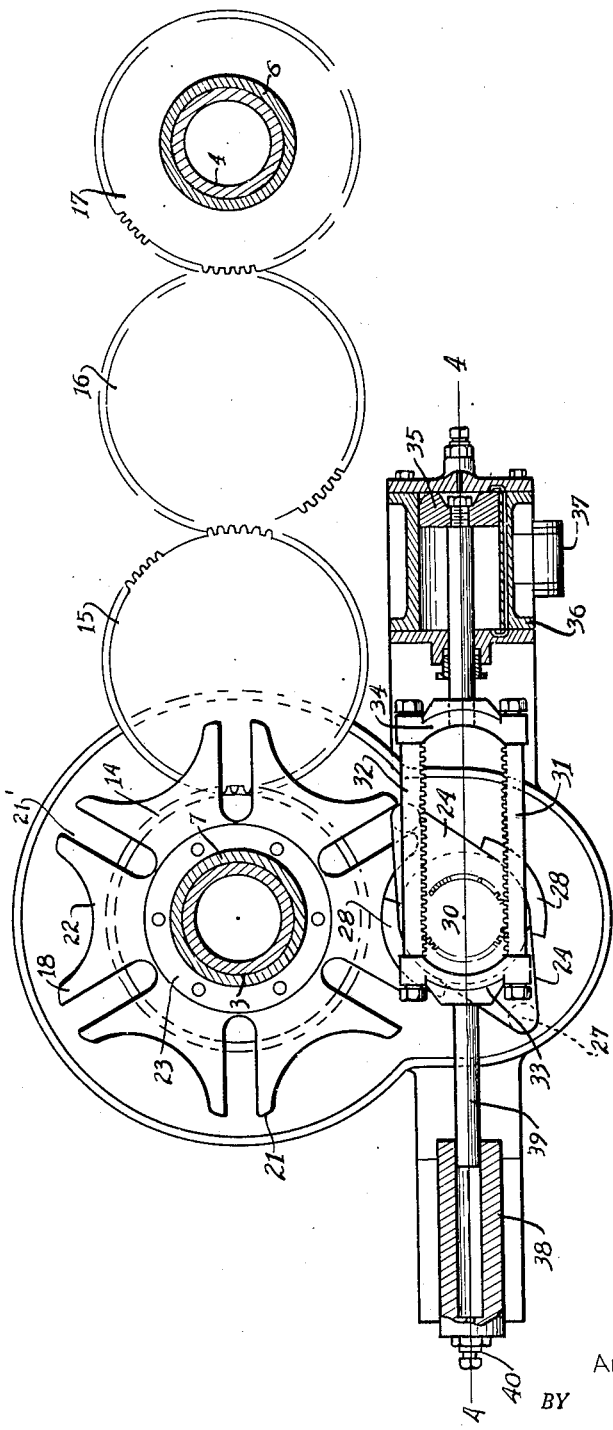
Fig. 3 is an enlarged plan view, showing the booster drive for the parison mold table.
Figure 4:
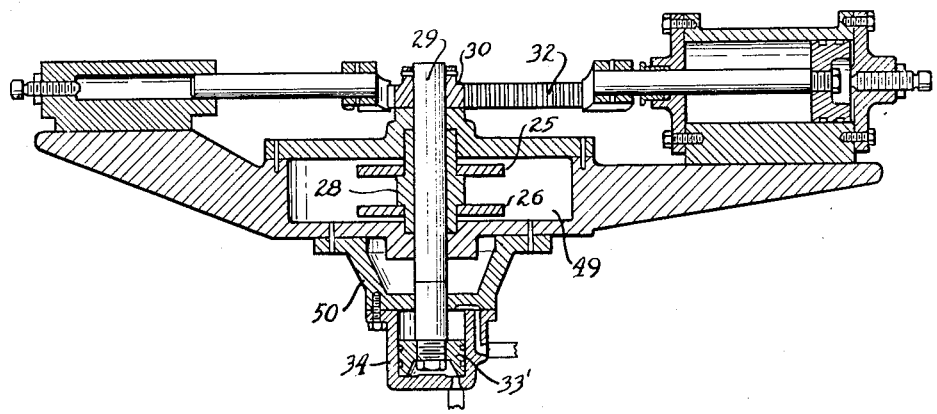
Fig. 4 is a longitudinal sectional view on the line 4—4 of Fig. 3.
Figure 5:
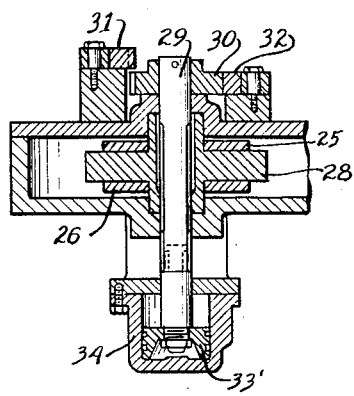
Fig. 5 is a detailed sectional view, showing more particularly the rack and gear arrangement for driving the rotater of the drive mechanism for the parison table.

The hub 6 of the finishing mold carrier is rotated through the medium of a suitable rack and gear mechanism comprising a pair of racks 8 and 9 operated by a reciprocating plunger 10, mounted in a suitable fluid pressure cylinder 11. One of these racks is in a higher horizontal plane than the other and these racks are adapted to engage a gear driving a gear 12 which is adapted to mesh with a driven gear 13 on the hub 6 of the finishing mold carrier. Suitable mechanism in the form of a piston and cylinder as illustrated in said Bridges' Patent No. 2,049,422 is used for alternately raising and lowering the gear adapted to be meshed with the racks 8 and 9, so that at one level, the gear will be meshed with the rack 9 during the projected movement, to the right looking at Fig. 2, of the rack and would be lowered to mesh with the rack 8 during the retracted movement of said rack, so that the reciprocating movement of the racks is translated in an intermittent rotary movement for driving the hub 6 of the finishing mold carrier in one direction, to wit, a clockwise direction.

The parison mold carrier hub 7 is drivingly connected with a finishing mold carrier hub 6 through a train of gears and to this end the parison mold carrier hub 7 is provided with a gear 14 meshing with a suitable gear 15, in turn meshing with a gear 16, which is driven from a gear 17 on the finishing mold carrier hub 6, so that the rotative movement imparted to the hub 6 is transmitted through the gear train to the hub 7, to cause a parison mold carrier to rotate in unison with the finishing mold carrier.

For supplementing the above drive of the parison mold carrier, I provide a supplemental pressure operated mechanism for rotating and indexing the parison mold carrier. To this end, I provide on the hub 7 of the parison mold carrier a Geneva gear 18. It is to be noted that the parison mold carrier illustrated is provided with six parison mold supports or with six stations, and that each station must be indexed to the point 19, in order that it may accurately coincide with certain vacuum producing means 20, and in order that it may be accurately indexed with respect to the delivery orifice of the furnace. Accordingly, the Geneva gear 18 is provided with six gear teeth 21 spaced by suitable slots 21' and provided with cam faces 22. This gear may be anchored to the hub 7 by being bolted to the underface of an annular flange 23 forming a part of the hub.

For driving the Geneva gear, I provide a rotator 24, which preferably comprises the upper and lower plates 25 and 26, each provided respectively at its ends with rollers 27, adapted to engage in the slots 21' in the teeth of the Geneva gear 18. The plates also carry between them a suitable cam member having locking cams 28 cooperatively adapted to engage the cam faces 22 of the gear 18 in the manner of the usual Geneva gear construction.

The rotator 24 is keyed to a driving shaft 29 in such a manner as to permit axial movement of the shaft. The shaft carries at its upper end a gear 30 adapted to intermittently engage the racks 31 and 32 of a rack drive, these racks being connected at their ends by the yokes 33 and 34. The rack 31 is in a higher horizontal plane than the rack 32, and therefore, when the gear 30 is in its lower plane, it will mesh with the rack 32 and in its upper plane with the rack 31, so that the reciprocating movement of the racks will impart an intermittent rotary movement in one direction only through the gear 30 and the shaft 29.

The shaft is vertically moved for respective engagement of the gear 30 with the racks 31 and 32 through the medium of a piston 33' secured to the bottom end of the shaft 29 and operating in a cylinder 34 to which air under pressure is admitted on the opposite sides of the piston in timed relation for the timed vertical movement of the gear 30.

The yoke, including the racks 31 and 32, is driven by a piston 35 operating within the cylinder 36 to which air under pressure is admitted to the opposite sides of the piston through a suitable timing valve 37, to thereby reciprocate the piston and the racks. The racks are cushioned in their movement through the medium of a cushioning cylinder 38, in which operates a plunger 39. From this cylinder 38 the egress and ingress of air is controlled by a suitable valve 40. The timing of the timing valve 37 coincides with the timing of the timing valve controlling the admission of pressure to the cylinder 11, so that the two drives will operate in unison.

In order that the booster indexing drive for the parison mold carrier may be applied to present types of commercial machines, the entire drive comprises a substantially unitary structure. To this end, the supporting mechanism for the drive comprises a pair of plates 41 and 42, bolted to the bed 1. Each of these plates comprises a casting having upwardly extending therefrom flanges 43 and 44 comprising a housing for the parts and the plates 41 and 42 are extended as at 45 and 46 beyond the sides of the base 1, and are provided with side arms 47 and 48. These side arms provide supports for the cylinders 36 and 38, and also the plates provide a well as at 49 to receive the rotator of the Geneva gear and to support the casting 50 carrying the elevating cylinder 34.

I claim as my invention:

1. In a glassware forming machine, in combination a movable mold carrier and a plurality of glass shaping mold supports mounted on said carrier, means for intermittently moving said carrier comprising a gear member drivingly connected with said mold carrier for effecting rotation thereof, a reciprocating member having oppositely disposed racks, one on each side of said gear member, said gear member being adapted to alternately mesh with said racks, a fluid pressure operated reciprocating piston operating said reciprocating member, a second movable mold carrier and a plurality of shaping mold supports mounted on said second carrier, a gear driving said second movable mold carrier, a gear train drive connecting said first carrier and the driving gear of said second carrier and comprising a plurality of intermeshing gears, a booster drive for said second mold carrier for effecting rotation thereof, comprising a second gear member associated with said second mold carrier, a second reciprocating member having oppositely disposed racks, one on each side of said second gear member, said second gear member being shiftable to alternately mesh with said racks and an indexing drive between said booster drive and said second carrier, including a Geneva gear drive having one member drivingly associated with said second carrier and the other member driven from said second gear member.

2. In a glassware forming machine, in combination, a movable mold carrier and a plurality of glass shaping mold supports mounted on said carrier, means for intermittently moving said carrier comprising a gear member drivingly connected with said mold carrier for effecting rotation thereof, a reciprocating member having oppositely disposed racks, one on each side of said gear member, said gear member being adapted to alternately mesh with said racks, a fluid pressure operated reciprocating piston operating said reciprocating member, a second movable mold carrier and a plurality of glass shaping mold supports mounted on said second carrier providing glass molding stations, a gear driving said second movable mold carrier, a gear train drive between said first mold carrier and said second mold carrier gear and comprising a plurality of intermeshing gears, an independently driven booster drive for said second mold carrier for effecting rotation thereof comprising a second gear member drivingly connected with said second mold carrier, a second reciprocating member having oppositely disposed racks, one on each side of said second gear member, said second gear member being shiftable to alternately mesh with said racks, and an indexing gear drive between said booster drive and said second carrier, including a Geneva gear drive having one member drivingly associated with said second carrier and provided with teeth corresponding in number to the molding stations on said second carrier and the other member driven from said second gear member.

3. In a glassware forming machine, in combination, a movable mold carrier and a plurality of glass shaping mold supports mounted on said carrier, means for intermittently moving said carrier comprising a gear member drivingly connected with said mold carrier for effecting rotation thereof, a reciprocating member having oppositely disposed racks, one on each side of said gear member, said gear member being adapted to alternately mesh with said racks, a fluid pressure operated reciprocating piston operating said reciprocating member, a second movable mold carrier and a plurality of glass shaping mold supports mounted on said second carrier and providing molding stations, a gear driving said second movable mold carrier, a gear train drive between said first mold carrier and the driving gear of said second mold carrier and comprising a plurality of intermeshing gears, an independently driven booster drive for said second mold carrier for effecting rotation thereof, comprising a second gear member associated with said second mold carrier, a reciprocating member having oppositely disposed racks, one on each side of said second gear member, said second gear member being shiftable to alternately engage its associated racks, and an indexing drive between said booster drive and said second carrier including a Geneva gear drivingly associated with said second carrier and having teeth corresponding in number to the stations on said second carrier and a rotater for driving said Geneva gear having two oppositely disposed tooth engaging members and driven from said second gear member.

4. In a glassware forming machine, in combination a movable mold carrier and a plurality of glass shaping mold supports mounted on said carrier, means for intermittently moving said carrier comprising a gear member drivingly connected with said mold carrier for effecting rotation thereof, a reciprocating member having oppositely disposed racks, one on each side of said gear member, said gear member being adapted to alternately mesh with said racks, a reciprocating fluid pressure operated motor for driving said reciprocating member, a second mold carrier and a plurality of glass shaping mold supports mounted on said second carrier, a gear train drivingly connecting said first mold carrier and a driving gear of said second mold carrier and comprising a plurality of intermeshing gears, an independently driven drive for said second mold carrier associated with said second mold carrier for effecting rotation thereof, comprising a second gear member associated with said second mold carrier, a second reciprocating member having oppositely disposed racks, one on each side of said second gear member, said second gear member being adapted to alternately mesh with said racks, a reciprocating fluid pressure motor for driving said second reciprocating member and an indexing drive between said independently driven drive and said second carrier including a Geneva gear drive having one member associated with said second carrier, and the other member driven from said second gear member.

5. In a glassware forming machine, in combination, a base, a movable mold carrier rotatably supported on said base, and a plurality of glass shaping mold supports mounted on said carrier, means for intermittently moving said carrier comprising a gear member associated with said mold carrier for effecting rotation thereof, a reciprocating member having oppositely disposed racks, one on each side of said gear member, said gear member being adapted to alternately mesh with said racks, a second movable mold carrier supported on said base and a plurality of glass shaping mold supports mounted on said second mold carrier, a gear train drive connecting said first mold carrier with said second mold carrier, a booster drive unit for said second mold carrier comprising a pair of separable plates mounted on said base, a housing section extending above each of said plates, a Geneva gear mounted within said housing section and drivingly connected with said second mold carrier, said housing sections extending beyond the side of said base and having laterally disposed wing plates disposed adjacent to and parallel with a side of said base, a rotater for driving said Geneva gear mounted within said housing and a booster drive for said rotater comprising a second gear member, a second reciprocating member having oppositely disposed racks, one on each side of said second gear member, said second gear member being shiftable to alternately mesh with said racks, a reciprocating fluid pressure operated motor supported on one of said laterally extending wing plates, drivingly connected with said second reciprocating member and a cushioning cylinder mounted on the other of said laterally extending wing plates, and a piston connected with an end of said second reciprocating member and operating in said cushioning cylinder.

6. In a glassware forming machine, in combination, a base, a movable mold carrier rotatably supported on said base and a plurality of glass shaping mold supports mounted on said carrier, means for intermittently moving said carrier comprising a gear member associated with said mold carrier for effecting rotation thereof, a reciprocating member having oppositely disposed racks, one on each side of said gear member, said gear member being adapted to alternately mesh with said racks, a second movable mold carrier supported on said base and a plurality of glass shaping mold supports mounted on said second mold carrier, a gear train drive drivingly connecting said first mold carrier with said second mold carrier, a booster drive unit for said second mold carrier comprising a pair of separable plates mounted on said base, a housing section extending above each of said plates, a Geneva gear mounted within said housing section and drivingly connected with said second mold carrier, said housing sections extending beyond the side of said base and having laterally disposed wing plates disposed adjacent to and parallel with a side of said base, a shaft vertically supported on said housing section extension, a gear mounted on the upper end of said shaft, a second reciprocating member having oppositely disposed racks, one on each side of said gear, one of said racks being arranged in a horizontal plane above that of the other of said racks, whereby upon the shifting of said gear vertically, the racks will alternately engage with said gear, a rotater for driving said Geneva gear mounted on said shaft and within said housing, a reciprocating fluid pressure operated motor supported on one of said laterally extending wing plates and drivingly connected with said second mentioned reciprocating member, a cushioning cylinder mounted on the other of said laterally extending wing plates, a piston connected with the end of said second reciprocating member and operating in said cushioning cylinder, a cylinder supported on the under side of said housing extension and a piston mounted on the lower end of said shaft, whereby said shaft may be vertically raised and lowered upon the admission of operating pressure to said piston.

ANTHONY T. ZAPPIA.

REFERENCES CITED

The following references are of record in the file of this patent:

UNITED STATES PATENTS

| Number | Name | Date |
|---|---|---|
| 1,796,992 | Helm et al. | Mar. 17, 1931 |
| 2,015,662 | Bridges | Oct. 1, 1935 |
| 2,235,047 | Sloan | Mar. 18, 1941 |
| 2,252,391 | Benoit et al. | Aug. 12, 1941 |